(12) United States Patent
Pacovský et al.

(10) Patent No.: US 9,049,055 B1
(45) Date of Patent: Jun. 2, 2015

(54) MESSAGE CLUSTERING BY CONTACT LIST

(75) Inventors: Ondřej Pacovský, Oberrieden (CH); Douglas Alexander Aberdeen, Zurich (CH); Pál Takácsi, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 211 days.

(21) Appl. No.: 13/368,309

(22) Filed: Feb. 7, 2012

(51) Int. Cl.
*G06F 15/16* (2006.01)
*H04L 12/58* (2006.01)
*G06Q 10/10* (2012.01)

(52) U.S. Cl.
CPC ............ *H04L 12/588* (2013.01); *G06Q 10/107* (2013.01)

(58) Field of Classification Search
CPC ........................... G06Q 10/107; H04L 12/588
USPC ......................................................... 709/206
See application file for complete search history.

(56) References Cited

U.S. PATENT DOCUMENTS

| | | | |
|---|---|---|---|
| 6,092,101 A * | 7/2000 | Birrell et al. .................. | 709/206 |
| 6,832,245 B1 * | 12/2004 | Isaacs et al. .................. | 709/206 |
| 7,574,478 B2 * | 8/2009 | Mittelstaedt et al. ......... | 709/206 |
| 2005/0060643 A1 * | 3/2005 | Glass et al. ................. | 715/501.1 |
| 2008/0126490 A1 | 5/2008 | Ahlenius et al. | |
| 2012/0158857 A1 * | 6/2012 | Loofbourrow ................ | 709/206 |
| 2013/0070587 A1 * | 3/2013 | Mattern ........................ | 370/229 |

* cited by examiner

*Primary Examiner* — Vivek Srivastava
*Assistant Examiner* — Karina J Garcia-Ching
(74) *Attorney, Agent, or Firm* — McDermott Will & Emery LLP

(57) ABSTRACT

Systems and methods for clustering messages are provided. In some aspects, a method includes receiving a set of communications. The set of communications includes a set of messages. Each communication in at least a portion of communications in the set of communications is associated with a set of contacts. The method also includes determining a first contact list based on the set of communications. The method also includes determining a first subset of the set of messages, each message in the first subset of the set of messages being associated with a set of contacts including at least a first threshold number of contacts in the first contact list. The method also includes providing an indication of the first subset of the set of messages.

19 Claims, 5 Drawing Sheets

MESSAGE CLUSTERING BY CONTACT LIST

FIELD

The subject technology generally relates to document management in a computer system and, in particular, relates to message clustering by contact list.

BACKGROUND

Users of email receive many different messages related to many different topics every day. These messages are often placed in a user's inbox with many other messages. Over time, users accumulate a large number of messages related to many different topics that are not clustered or arranged by topic. Thus, users may spend a lot of time locating email messages that are important or relevant to certain topics. Alternatively, users of email may create their own labels or folders for their messages and spend time and resources to review the messages and assign appropriate labels or folders. As the foregoing illustrates, a technique to automatically cluster messages may be desirable.

SUMMARY

The disclosed subject matter relates to a computer-implemented method for clustering messages. The method includes receiving a set of communications. The set of communications includes a set of messages. Each communication in at least a portion of communications in the set of communications is associated with a set of contacts. The method also includes determining a first contact list based on the set of communications. The method also includes determining a first subset of the set of messages, each message in the first subset of the set of messages being associated with a set of contacts including at least a first threshold number of contacts in the first contact list. The method also includes providing an indication of the first subset of the set of messages.

The disclosed subject matter further relates to a computer-readable medium. The computer-readable medium includes instructions that, when executed by a computer, cause the computer to implement a method for clustering messages. The instructions include code for receiving a set of communications. The set of communications includes a set of messages. Each communication in at least a portion of communications in the set of communications is associated with a set of contacts. The instructions also include code for determining a plurality of contact list based on the set of communications. The instructions also include code for, for each contact list in the plurality of contact lists, determining a corresponding subset of the set of messages, each message in the corresponding subset of the set of messages being associated with a set of contacts including at least a first threshold number of contacts in the contact list. The instructions also include code for providing an indication of the corresponding subsets of the set of messages.

The disclosed subject matter further relates to a system. The system includes an input device. The input device is configured to receive a set of communications. The set of communications includes a set of messages. Each communication in at least a portion of communications in the set of communications is associated with a set of contacts. The set of communications also includes a contact list detection module. The contact list detection module is configured to detect plural ones of communications in the set of communications that are associated with a first contact. The contact list detection module is also configured to determine that at least a threshold proportion of the communications associated with the first contact are also associated with a second contact. The contact list detection module is also configured to assign at least the first contact and the second contact to a contact list. The contact list detection module is also configured to provide an indication of the contact list. The system also includes a subset detection module. The subset detection module is configured to receive the contact list from the contact list detection module. The subset detection module is also configured to automatically determine a subset of the set of messages, each message in the subset of the set of messages being associated with a set of contacts including at least a first threshold number of contacts in the contact list. The subset detection module is also configured to provide an indication of the subset of the set of messages.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is related to message clustering by contact list. In one implementation, a computer may receive a set of communications. The set of communications may include email messages, shared documents, or social networking posts or messages associated with an account of a person or entity. The set of communications may include a set of messages, e.g., email messages. The set of messages may be equivalent to the set of communications or a subset of the set of communications. Each communication in at least a portion of communications in the set of communications may be associated with a set of contacts. The set of contacts associated with a communication may include, for example, entities mentioned in the from, to, or carbon copy fields of an email message, entities with whom a document is shared, or entities that are mentioned or that commented on a social networking post. The computer may determine a contact list based on the set of communications. In one implementation, the computer may determine the contact list by determining that at least a threshold proportion of the communications in the set of communications that are associated with a first contact are also associated with a second contact and assigning at least the first contact and the second contact to the contact list. The computer may also automatically determine a subset of the set of messages, each message in the subset of the set of messages being associated with a set of contacts including at least a threshold number of contacts in the contact list. The computer may also provide an indication of the subset of the set of messages.

Figure 1:
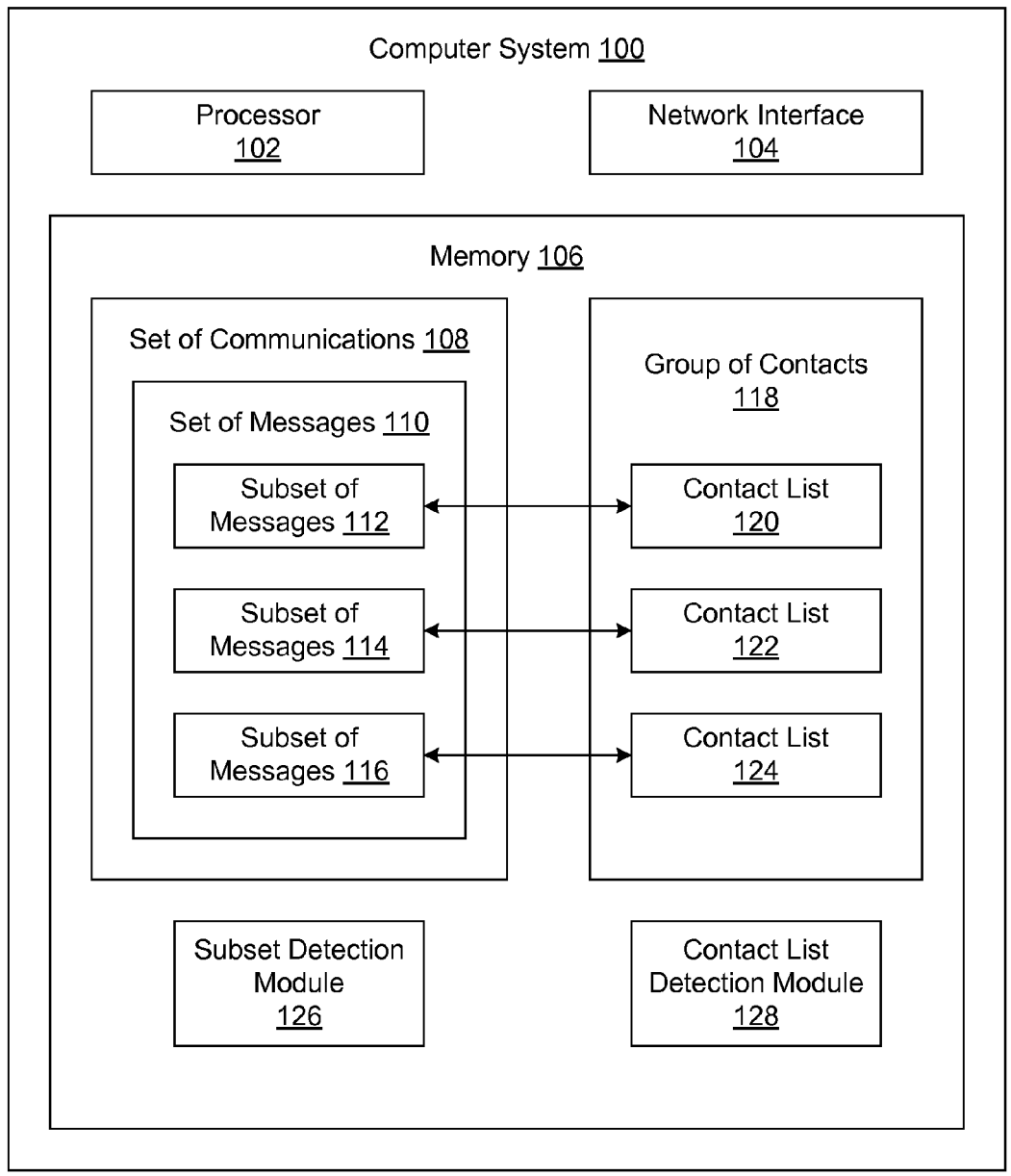
FIG. 1 illustrates an example of a computer system configured to implement message clustering by contact list.

FIG. 1 illustrates an example of a computer system 100 configured to implement message clustering by contact list.

The computer system 100 may be a client computing device running an email program or another document management program or a server machine storing email or other documents, e.g., a mail server. As shown, the computer 100 includes a processor 102, a network interface 104, and a memory 106. The processor 108 is configured to execute computer instructions that are stored in a computer-readable medium, such as the memory 106. For example, the processor 102 may be a central processing unit (CPU). The network interface 104 is configured to allow the computer system 100 to transmit and receive data in a network, e.g., the Internet or a cellular network. The network interface 104 may include one or more network interface cards (NICs). The memory 106 stores data and instructions. As illustrated, the memory 106 stores a set of communications 108 that includes a set of messages 110. The set of messages may include one or more subsets of messages 112, 114, or 116. The memory may also include a group of contacts 118. Each subset of messages 112, 114, or 116 may be associated with a respective contact list 120, 122, and 124 within the group of contacts 118. As illustrated, the memory also includes a subset detection module 126 and a contact list detection module 128.

The set of communications 108 may include indications of communications between entities, for example, email messages, text chat sessions, audio chat sessions, video chat sessions, posts within a social networking service, messages within a social networking service, or shared documents within a document sharing service. The computer system 100 may receive the set of communications 108 via an input, e.g., via the network interface 104. In one implementation, the set of communications may be associated with a single entity, e.g., a holder of an account in an email, online chat, social networking, or document management service. One or more communications in the set of communications 108 may be associated with a set of contacts, e.g., a contact who participated in the communication, a sender of the communication, or a recipient of the communication. The set of messages 110 may be a subset of the set of communications 108, for example, the set of messages 110 may include email messages, while the set of communications 108 includes email messages and other communications, as set forth above. The set of messages 110 may be equivalent to the set of communications 108 or may include only a portion of the set of communications 108.

The set of messages 110 may include one or more subsets of messages 112, 114, or 116. Each subset of messages 112, 114, or 116 may include at least a minimum threshold proportion (e.g., 1%) and at most a maximum threshold proportion (e.g., 50%) of the messages in the set of messages 110. The subsets of messages 112, 114, or 116 may be mutually exclusive. Alternatively, the subsets of messages 112, 114, or 116 may not be mutually exclusive. In one implementation, an intersection of a first subset of the set of messages (e.g., subset 112) and a second subset of the set of messages (e.g., subset 114) may include at most a threshold number of messages (e.g., five messages) or a threshold proportion of the messages in the set of messages (e.g., 0.1%).

The group of contacts 118 may be a group of contacts associated with the set of communications 108. For example, if set of communications 108 is associated with a holder of an account in an email, online chat, social networking, or document management service, the group of contacts 118 may include all or part of the set of contacts with whom a holder of the account may have communicated, e.g., via email, online text, voice, or video chat, via the social network, or via document sharing. Each contact list 120, 122, or 124 may include a portion of the contacts in the group of contacts 118. Each contact list 120, 122, or 124 may be associated with a respective subset of messages 112, 114, or 116. The respective subset of messages (e.g., subset 112) may include at least a threshold number (e.g., four) or at least a threshold proportion (e.g., 50%) of the contacts in the associated contact list (e.g., contact list 120).

While only three subsets of messages 112, 114, and 116 and only three contact lists 120, 122, and 124 are illustrated in FIG. 1, the subject technology may be implemented with any number of subsets of messages or contact lists. For example, the subject technology may be implemented with one, two, three, four, five, or more than five subsets of messages or with one, two, three, four, five, or more than five contact lists.

As shown, the memory 106 of the computer system 100 also includes a subset detection module 126. The subset detection module 126 may be configured to receive a contact list, e.g., contact list 120. The contact list may be received from the contact list detection module 128, described below. In response to receiving the contact list, the subset detection module 126 may determine a subset of the set of messages 110, e.g., subset of messages 112, each message in the subset the set of contacts including at least a threshold number (e.g., four) of contacts in the contact list (e.g. contact list 120) provided to the subset detection module 126. The subset detection module 126 may provide an indication of the subset of the set of messages as output.

The memory 106 of the computer system 100 may also include a contact list detection module 128. The contact list detection module 128 may be configured to detect plural ones of communications in the set of communications that are associated with a first contact. The first contact may be one or more of an email account, e.g., an email account associated with the email address JohnSmith@ABC-Corporation.com, a document sharing account or a social networking account. Each of the email account, the document sharing account, or the social networking account may be associated with the same person, e.g., John Smith. The contact list detection module 128 may also be configured to detect that at least a threshold proportion (e.g., 40%) of the communications associated with the first contact are also associated with a second contact. For example, at least the threshold proportion of emails with John Smith as a sender or recipient may have included a second contact, e.g., Jane Rodgers, as a sender or recipient. At least the threshold proportion of documents shared with John Smith may have also been shared with Jane Rodgers. At least the threshold proportion of content in the social network associated with the holder of the account associated with the set of communications 108 and with John Smith may also be associated with Jane Rodgers. E.g., John Smith may have posted a content item in the social network on which both the holder of the account and Jane Rodgers commented. Based on the determination that at least the threshold proportion of communications associated with a first contact are also associated with a second contact, the first contact and the second contact (e.g., John Smith and Jane Rodgers) may both be assigned to a contact list. Additional contacts may be assigned to the contact list in a similar manner, based on shared or common communications with either the first contact or the second contact. The contact list detection module 128 may provide an indication of the contact list as output.

Figure 2:
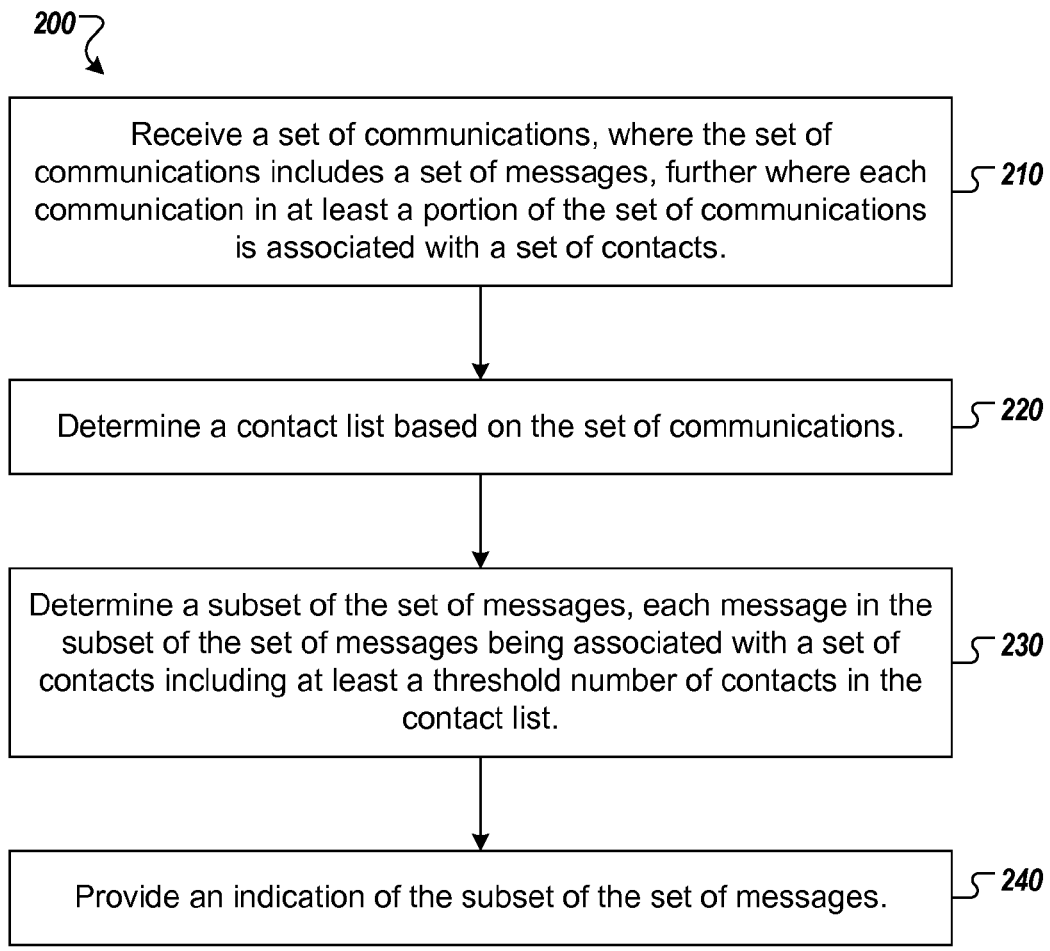
FIG. 2 illustrates an example process by which messages may be clustered by contact list.

FIG. 2 illustrates an example process 200 by which messages may be clustered by contact list. In one example, the process 200 may be initiated by receiving, from a user (e.g., a user of an email account), a request to cluster a set of messages (e.g., the email messages in the email account).

The process 200 begins at step 210, where a computer receives a set of communications. The set of communications may include the set of messages. The set of messages may include a large number of messages (e.g., at least 1000 messages). Each communication in at least a portion of the set of communications may be associated with a set of contacts. The set of messages may be equivalent to the set of communications or may include a portion of the set of communications. The set of communications may include one or more of email messages, text chat sessions, audio chat sessions, video chat sessions, posts within a social networking service, messages within a social networking service, or shared documents within a document sharing service. The set of messages may include email messages. The set of contacts associated with a communication may include a sender of the communication, at least one recipient of the communication, or a participant in the communication, e.g., a participant in a video conference call, an entity mentioned in a social networking post, or an entity that commented on a social networking post.

In step 220, the computer determines a contact list based on the set of communications. A process by which the contact list may be detected based on the set of communications is described in detail below in conjunction with FIG. 3. Only a single contact list may be detected. Alternatively, multiple contact lists may be detected. For example, two, three, four, five, or more than five contact lists may be detected.

In step 230, the computer determines a subset of the set of messages, each message in the subset of the set of messages being associated with a set of contacts including at least a threshold number (e.g., four) of the contacts in the contact list or a threshold proportion (e.g., 40%) of the contacts in the contact list. The threshold number of contacts required for a message to be included in the subset may be constant for all contact list sizes or may vary based on the size of the contact list (e.g., a contact list with five contacts may have a smaller threshold number of contacts than a contact list with twenty contacts). The subset of the set of messages may include at least a minimum threshold proportion (e.g., 1%) of the messages in the set and at most a maximum threshold proportion (e.g., 50%) of the messages in the set. If multiple contact lists are detected, multiple subsets of the set of messages may be detected. The subsets of messages may be mutually exclusive. Alternatively, the subsets of messages may not be mutually exclusive. In one implementation, an intersection of a first subset of the set of messages and a second subset of the set of messages may include at most a threshold number of messages (e.g., five messages) or a threshold proportion of the messages in the set of messages (e.g., 0.1%).

In step 240, the computer provides an indication of the subset of the set of messages. The indication may include pointers that allow labels to be added to the messages in the subset. Alternatively, the indication may include the messages in the subset themselves. The messages in the subset may be associated with a label or a folder in the email account. The title of the label or the folder may be determined based on a contact in the contact list associated with the subset or based on one or more words in a subject of one or more messages in the subset. After step 240, the process 200 ends.

Figure 3:
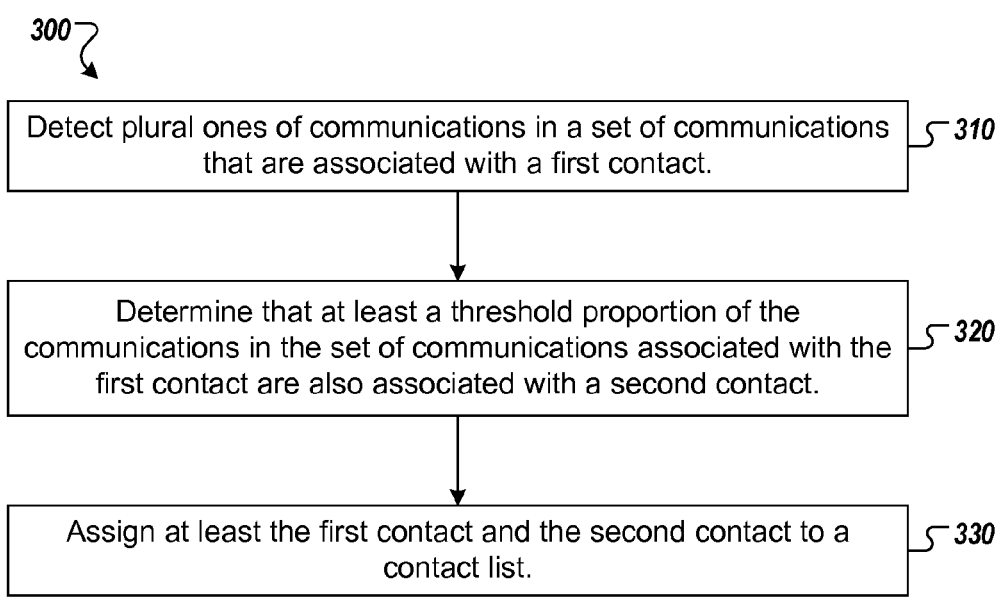
FIG. 3 illustrates an example process by which a contact list may be detected based on a set of communications.

FIG. 3 illustrates an example process 300 by which a contact list may be detected based on a set of communications.

The process 300 begins at step 310, where a computer detects plural ones of communications in a set of communications that are associated with a first contact. The first contact may be associated with a first account (e.g., of Mary Higgins) in an email, online chat, social networking, or document management service.

In step 320, the computer determines that at least a threshold proportion of the communications in the set of communications associated with the first contact (e.g., Mary Higgins) are also associated with a second contact (e.g., Joe Rivers). For example, the set of communications may include email messages sent to Mary Higgins which were carbon copied to Joe Rivers. The set of communications may include documents that were shared with both Mary Higgins and Joe Rivers. The set of communications may include posts within a social networking service on which both Mary Higgins and Joe Rivers commented.

In step 330, the computer assigns at least the first contact and the second contact to a contact list. In one example, the contact list may include only the first contact and the second contact. Alternatively, a new contact may be added to the contact list using a process similar to that described above. For example, if a threshold proportion of the communications that include second contact Joe Rivers also include a third contact, e.g. Cindy King, then third contact Cindy King may be added to the contact list. After step 330, the process 300 ends.

Figure 4:
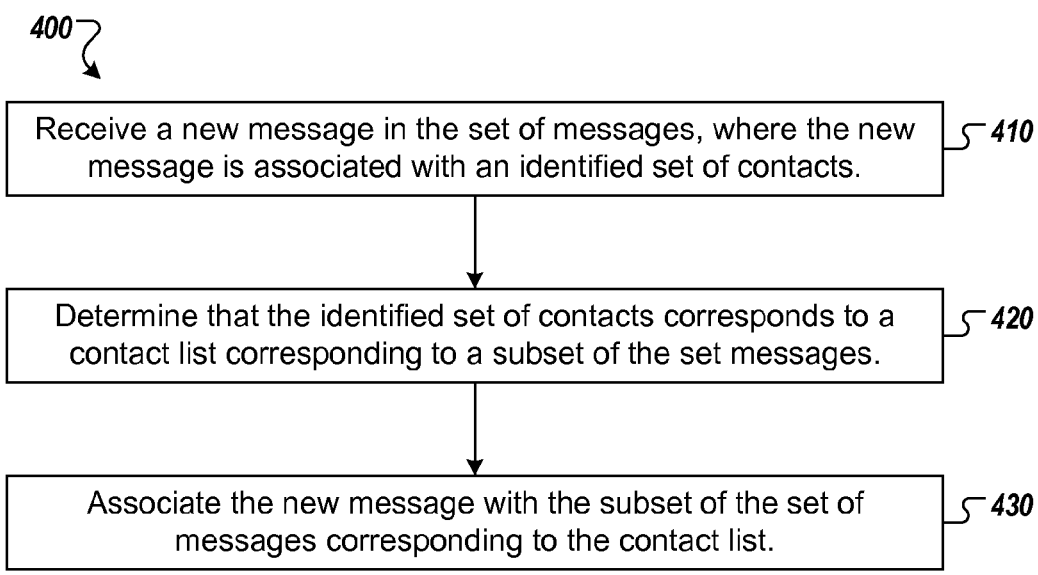
FIG. 4 illustrates an example process by which a new message may be associated with a subset a set of messages.

FIG. 4 illustrates an example process 400 by which a new message may be associated with a subset a set of messages.

The process 400 begins at step 410, where a computer receives a new message in the set of messages. For example, the computer may receive a new messages that was received in or sent from an email account associated with a particular email address. The message may be associated with an identified set of contacts. For example, the message may include identified contacts in its from field, to field, or carbon copy field.

In step 420, the computer determines that the identified set of contacts corresponds to a contact list corresponding to a subset of the set of messages. The subset may have been identified via the process described above in conjunction with FIG. 2. In one example, the set of messages may include a plurality of subsets, each of which is associated with a contact list. The identified set of contacts may correspond to at least one contact list from the contact lists associated with the plurality of subsets.

In step 430, the computer associates the new message with the subset of the set of messages corresponding to the contact list to which the identified set of contacts corresponds. If there are multiple contact lists and multiple subsets of messages, the identified set of contacts may correspond to one contact list or to multiple contact lists. As a result, the new message may correspond to one subset or to multiple subsets. After step 430, the process 400 ends.

Figure 5:
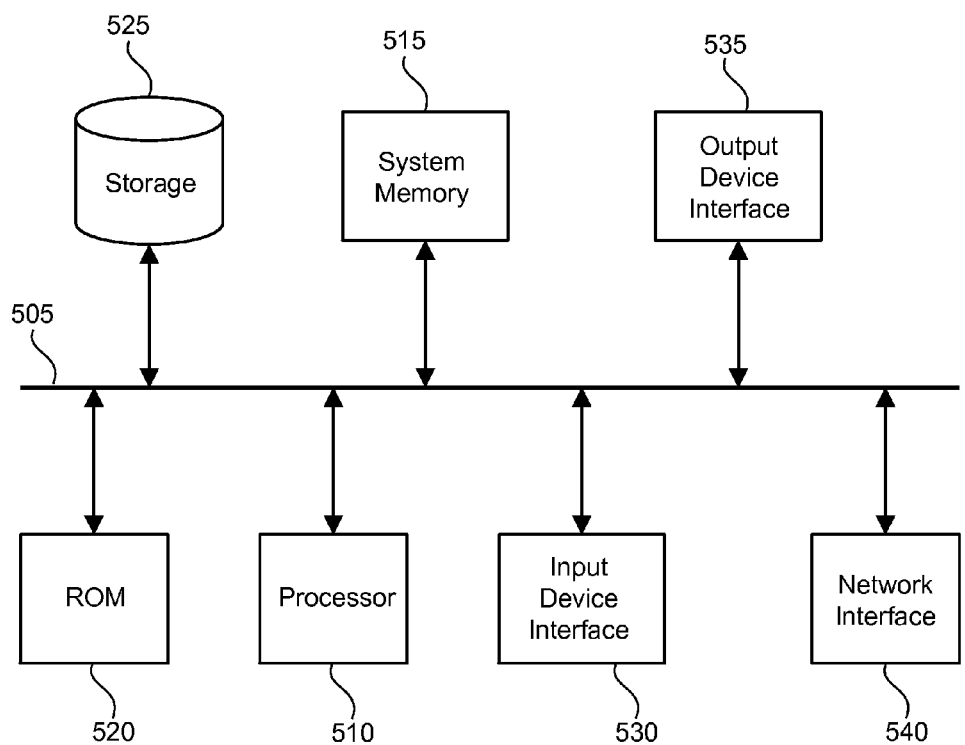
FIG. 5 conceptually illustrates an electronic system with which some implementations of the subject technology are implemented.

FIG. 5 conceptually illustrates an electronic system 500 with which some implementations of the subject technology are implemented. For example, the computer system 100 may be implemented using the arrangement of the electronic system 500. The electronic system 500 can be a computer (e.g., a mobile phone, PDA), or any other sort of electronic device. Such an electronic system includes various types of computer readable media and interfaces for various other types of computer readable media. Electronic system 500 includes a bus 505, processing unit(s) 510, a system memory 515, a read-only memory 520, a permanent storage device 525, an input device interface 530, an output device interface 535, and a network interface 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some implementations of the subject technology use a mass-storage device (for example a magnetic or optical disk and its corresponding disk drive) as the permanent storage device 525.

Other implementations use a removable storage device (for example a floppy disk, flash drive, and its corresponding disk drive) as the permanent storage device 525. Like the permanent storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the processes of the subject technology are stored in the system memory 515, the permanent storage device 525, or the read-only memory 520. For example, the various memory units include instructions for message clustering by contact list in accordance with some implementations. From these various memory units, the processing unit(s) 510 retrieves instructions to execute and data to process in order to execute the processes of some implementations.

The bus 505 also connects to the input and output device interfaces 530 and 535. The input device interface 530 enables the user to communicate information and select commands to the electronic system. Input devices used with input device interface 530 include, for example, alphanumeric keyboards and pointing devices (also called "cursor control devices"). Output device interfaces 535 enables, for example, the display of images generated by the electronic system 500. Output devices used with output device interface 535 include, for example, printers and display devices, for example cathode ray tubes (CRT) or liquid crystal displays (LCD). Some implementations include devices for example a touchscreen that functions as both input and output devices.

Finally, as shown in FIG. 5, bus 505 also couples electronic system 500 to a network (not shown) through a network interface 540. In this manner, the electronic system 500 can be a part of a network of computers (for example a local area network ("LAN"), a wide area network ("WAN"), or an Intranet, or a network of networks, for example the Internet. Any or all components of electronic system 500 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server". "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for clustering messages, the method comprising:
receiving a set of communications, wherein the set of communications includes a set of messages that is a subset of the set of communications, wherein one or more communications in the set of communications is associated with a set of contacts, wherein the set of communications comprises messages of a first type and communications of one or more types, and wherein the set of messages comprises messages of the first type;

receiving, from a user, a request to cluster the set of messages;

determining a first contact list based on the set of communications;

determining a first subset of the set of messages, each message in the first subset of the set of messages being associated with a set of contacts comprising at least a first threshold number of contacts in the first contact list, wherein the first threshold number of contacts in the contact list includes more than one contact;

determining a second contact list based on the set of communications;

determining a second subset of the set of messages, each message in the second subset of the set of messages being associated with a second set of contacts comprising at least the first threshold number of contacts in the first contact list, wherein each of the first subset of the set of messages and the second subset of the set of messages comprises at least a minimum threshold proportion and at most a maximum threshold proportion of the messages in the set of messages, wherein the first subset of the set of messages and the second subset of the set of messages are not mutually exclusive, and wherein an intersection of the first subset of the set of messages and the second subset of the set of messages include at most a second threshold number of messages or a threshold proportion of the messages in the set of messages; and providing an indication of the first subset of the set of messages.

2. The method of claim 1, wherein the set of messages comprises at least 1000 messages.

3. The method of claim 1, wherein the set of communications comprises one or more of: email messages, text chat sessions, audio chat sessions, video chat sessions, posts within a social networking service, messages within a social networking service, or shared documents within a document sharing service.

4. The method of claim 1, wherein the set of messages comprises email messages.

5. The method of claim 1, wherein the set of contacts associated with a communication comprises a sender.

6. The method of claim 1, wherein the set of contacts associated with a communication comprises at least one recipient.

7. The method of claim 1, wherein the set of contacts associated with a communication comprises a participant in the communication.

8. The method of claim 1, wherein determining the first contact list based on the set of communications comprises:

detecting plural ones of communications in the set of communications that are associated with a first contact;

determining that at least a threshold proportion of the communications associated with the first contact are also associated with a second contact; and assigning at least the first contact and the second contact to the first contact list.

9. The method of claim 1, further comprising associating the first subset of the set of messages with a label.

10. The method of claim 9, further comprising determining a title of the label based on a contact in the first contact list.

11. The method of claim 9, determining a title of the label based on a word in a subject of a message in the first subset of the set of messages.

12. A non-transitory computer-readable medium for clustering messages, the non-transitory computer-readable medium comprising instructions that, when executed by a computer, cause the computer to:

receive a set of communications, wherein the set of communications includes a set of messages that is a subset of the set of communications, wherein one or more communications in the set of communications is associated with a set of contacts, wherein the set of communications comprises messages of a first type and communications of one or more types, and wherein the set of messages comprises messages of the first type;

receive, from a user, a request to cluster the set of messages;

determine a plurality of contact lists based on the set of communications;

for each contact list in the plurality of contact lists, determine a corresponding subset of the set of messages, each message in the corresponding subset of the set of messages being associated with a set of contacts comprising at least a first threshold number of contacts in the contact list, wherein the first threshold number of contacts in the contact list includes more than one contact, wherein the determined corresponding subsets of the set of messages comprise a first subset of the set of messages and a second subset of the set of messages, wherein each of the first subset of the set of messages and the second subset of the set of messages comprises at least a minimum threshold proportion and at most a maximum threshold proportion of the messages in the set of messages, wherein the first subset of the set of messages and the second subset of the set of messages are not mutually exclusive, and wherein an intersection of the first subset of the set of messages and the second subset of the set of messages include at most a second threshold number of messages or a threshold proportion of the messages in the set of messages; and provide an indication of the corresponding subsets of the set of messages.

13. The non-transitory computer-readable medium of claim 12, wherein the plurality of contact lists comprises at least four contact lists.

14. The non-transitory computer-readable medium of claim 12, wherein the corresponding subsets of the set of messages are mutually exclusive.

15. The non-transitory computer-readable medium of claim 12, further comprising instructions that, when executed by the computer, cause the computer to:

receive a new message in the set of messages, wherein the new message is associated with an identified set of contacts;

determine that the identified set of contacts corresponds to at least one contact list in the plurality of contact lists; and associate the new message with at least one subset of the set of messages corresponding to the at least one contact list.

16. A system comprising:

an input device configured to:

receive a set of communications, wherein the set of communications includes a set of messages that is a subset of the set of communications, further wherein one or more communications in the set of communications is associated with a set of contacts, wherein the set of communications comprises messages of a first type and communications of one or more types, and wherein the set of messages comprises messages of the first type;

a contact list detection module configured to:

receive, from a user, a request to cluster the set of messages;

detect plural ones of communications in the set of communications that are associated with a first contact, determine that at least a threshold proportion of the communications associated with the first contact are also associated with a second contact, assign at least the first contact and the second contact to a contact list, and provide an indication of the contact list; and a subset detection module configured to:

receive the contact list from the contact list detection module, determine a first subset of the set of messages, each message in the first subset of the set of messages being associated with a set of contacts comprising at least a first threshold number of contacts in the contact list, wherein the first threshold number of contacts in the contact list includes more than one contact, determine a second contact list based on the set of communications;

determine a second subset of the set of messages, each message in the second subset of the set of messages being associated with a second set of contacts comprising at least the first threshold number of contacts in the contact list, wherein each of the first subset of the set of messages and the second subset of the set of messages comprises at least a minimum threshold proportion and at most a maximum threshold proportion of the messages in the set of messages, wherein the first subset of the set of messages and the second subset of the set of messages are not mutually exclusive, and wherein an intersection of the first subset of the set of messages and the second subset of the set of messages include at most a second threshold number of messages or a threshold proportion of the messages in the set of messages; and provide an indication of the first subset of the set of messages.

17. The system of claim 16, wherein the input device comprises a network interface.

18. The method of claim 1, wherein the first threshold number of contacts in the contact list comprises a predetermined proportion of a total number of contacts in the contact list.

19. The method of claim 1, wherein the first type comprises email messages, and wherein the one or more types comprise one or more of: text chat sessions, audio chat sessions, video chat sessions, posts within a social networking service, messages within a social networking service, or shared documents within a document sharing service.

* * * * *